United States Patent [19]

Holton

[11] Patent Number: 4,776,740
[45] Date of Patent: Oct. 11, 1988

[54] STUD FASTENER

[75] Inventor: Robert J. Holton, Mission Viejo, Calif.

[73] Assignee: Eaton Corporation, Cleveland, Ohio

[21] Appl. No.: 58,953

[22] Filed: Jun. 5, 1987

Related U.S. Application Data

[63] Continuation-in-part of Ser. No. 912,725, Sep. 29, 1986, abandoned.

[51] Int. Cl.⁴ .............................................. F16B 21/20
[52] U.S. Cl. .................................... 411/521; 411/516; 411/520; 411/918
[58] Field of Search ............... 411/521, 516, 512, 918, 411/517, 518, 519, 520

[56] References Cited

U.S. PATENT DOCUMENTS

| | | | |
|---|---|---|---|
| 1,672,562 | 6/1928 | Evans | 411/517 X |
| 1,675,277 | 6/1928 | Roe | 411/918 X |
| 2,156,169 | 4/1939 | Unke | 411/436 X |
| 2,309,613 | 1/1943 | Horton | |
| 2,315,209 | 3/1943 | Kost | 411/918 X |
| 2,481,325 | 9/1949 | Miller | 411/521 |
| 3,018,685 | 1/1962 | Squire | 411/520 |
| 3,419,292 | 12/1968 | Peltret et al. | 403/261 |

*Primary Examiner*—Gary L. Smith
*Assistant Examiner*—Curtis B. Brueske
*Attorney, Agent, or Firm*—A. E. Chrow

[57] ABSTRACT

A push-on type fastener (40) is provided for securing a cylindrical member such as a stud shank to an object. Fastener (40) includes generally axially aligned entrance opening (4) and exit aperture (6) surrounded by a resilient hollow projection (2) having a circumferentially continuous side wall. Aperture (6) is a non-circular opening defined between at least two retaining edges of projection (2) that are operative to provide engagement with the cylindrical member enabling the member to slide axially through exit aperture (6) from entrance opening (4) but inhibit movement in the opposite direction and which respectively include warped arcuate sections (3) adjacent the intersection between the respective extremities thereof that are operative to provide a stiffener for the retaining edges for smaller shank diameters and to stretch and prevent the retaining edges for splitting for larger shank diameters.

7 Claims, 2 Drawing Sheets

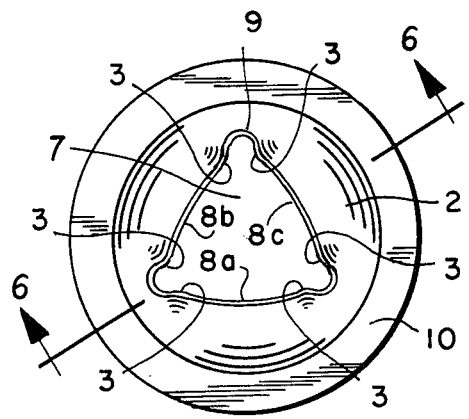
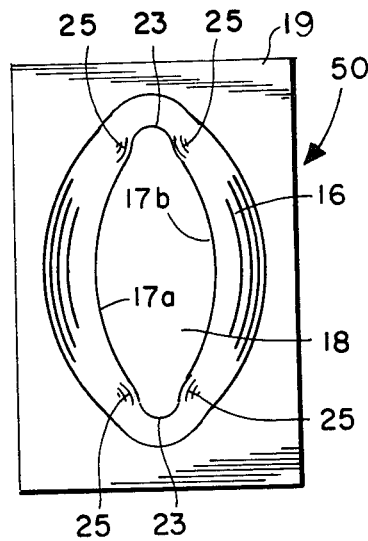
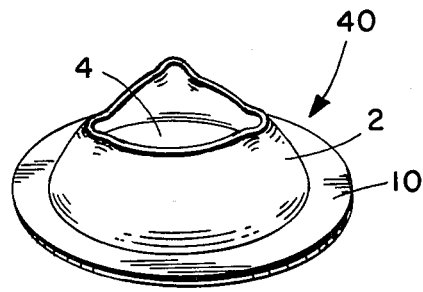
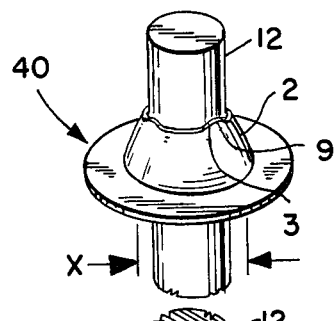
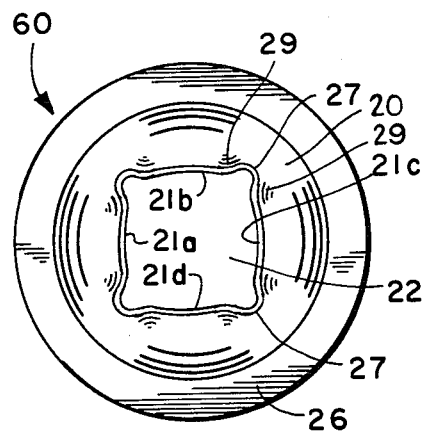
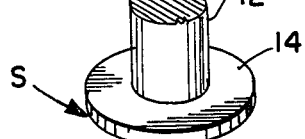

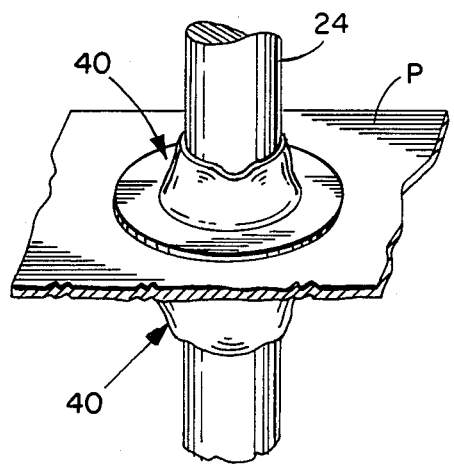
_Fig. 4_
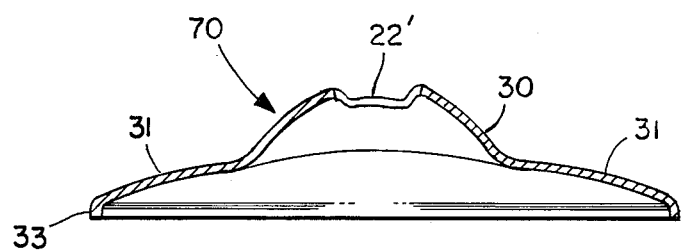
_Fig. 5_
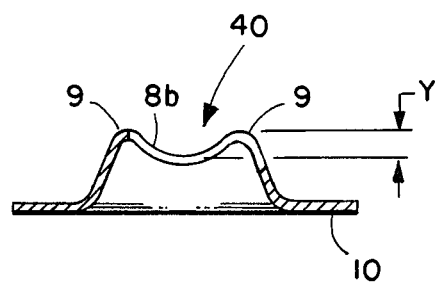
_Fig. 6_

STUD FASTENER

This invention is a continuation-in-part of application Ser. No. 912,725, filed Sept. 29, 1986, now abandoned, assigned to the assignee of this invention.

INTRODUCTION

This invention relates generally to a fastener for securing a member such as a stud having a generally cylindrically shaped shank to a panel or the like and more particularly to a push-on type fastener that features a non-circular shaped aperture defined between at least two spaced-apart retaining edges that are operative to engage the shank and secure the stud to the panel.

BACKGROUND OF THE INVENTION

Push-on type retaining fasteners are well known in the prior art. Such fasteners are commonly made in one piece for example by stamping thin wall resilient metal such as sheet metal to provide what is characteristically a frusto-conical shaped washer in appearance.

Such fasteners have historically featured a hollow frusto-conical projection having generally axial aligned entrance and exit openings that are both circular with the exit opening surrounded by an edge of the fastener adapted such that, when a cylindrical member is received through the entrance opening by pushing the fastener in a direction thereagainst, the edge provides a continuous circumferential engagement therewith that is operative to frictionally secure the fastener to the member when one attempts to remove the fastener in an opposite direction.

Examples of prior art fasteners of the type of interest to the present invention may be seen by reference to U.S. Pat. Nos. 2,975,667; 2,986,060; 3,032,807; 3,108,371; and 4,385,431, the disclosures of which are included herein by reference. Generally, such fasteners feature a circular exit aperture circumscribed by a retaining edge that is unable to stretch and is thus limited to cylindrical members having small diameter variations or which in some cases feature circumferentially spaced slits extending radially outwardly through the projection wall to provide a plurality of resilient arms that, although can expand to accommodate a broader range of cylindrical diameters, may tend to split along the slit or promote flex fatigue due to the reduced circumferential breadth of the individual arms.

An example of a push-on type fastener having a non-circular exit opening is disclosed in FIGS. 1–3 of U.S. Pat. No. 1,675,277, the disclosure of which is incorporated herein by reference. However, the intersections of the adjacent arcuate edges forming the non-circular opening is shaped into sharp projections which extend radially inwardly and are highly susceptible to breakage.

An example of a fastener for a door handle having what at first appears to be a non-circular opening but actually is not by comprising a plurality of opposed arcuate spaced teeth for engaging a part of the handle that are arranged in a circular configuration is disclosed in U.S. Pat. No. 1,808,048, the disclosure of which is incorporated herein by reference.

Finally, an example of a retainer having a generally square shaped opening adapted to enable a generally square shaped portion of a shaft to extend therethrough is disclosed in U.S. Pat. No. 3,419,292, the disclosure of which is incorporated herein by reference.

Thus, prior art push-on type fasteners have historically featured either circular or non-circular apertures surrounded either by a smooth retaining edge operative to secure a cylindrical shank having only small diameter variations or in many cases by spaced projecting teeth subject to breakage or that include radial slots and the like subject to splitting.

The shortcomings of prior art fasteners are overcome by the fastener of the present invention by the discovery that changing the exit aperture to a non-circular aperture defined between at least two spaced-apart retaining edges that enable the fastener to accommodate a broad range of cylindrical diameters as well as including means enabling the retaining edges to stretch to prevent their splitting as the diameter increases from a minimum to a maximum.

SUMMARY OF THE INVENTION

Accordingly, it is an object of this invention to provide a push-on type fastener.

It is another object of this invention to provide a push-on type fastener that features a non-circular exit aperture surrounded by at least two spaced-apart retaining edges that are operative to expand without splitting to accommodate a broad range of cylindrical member diameters engaged thereby whilst operative to frictionally secure the fastener to the member.

BRIEF DESCRIPTION OF THE DRAWINGS

FIG. 1A is a top plan view of a preferred embodiment of a fastener 40 having a generally triangular shaped exit aperture in accordance with the invention;

FIG. 1B is a perspective view of fastener 40 of FIG. 1A;

FIG. 1C is a perspective view of fastener 40 of FIGS. 1A and 1B secured to a stud shank 12;

FIG. 2 is a top plan view of an embodiment 50 of the fastener of the invention;

FIG. 3 is a top plan view of an embodiment 60 of the fastener of the invention;

FIG. 4 is a partial side elevation view of another application of the fastener of the invention;

FIG. 5 is a central cross-sectional view of fastener 70 of the invention made from a Belville washer; and FIG. 6 is a cross-section taken along line 6—6 of fastener 40 of FIG. 1A.

DESCRIPTION OF THE SOME PREFERRED EMBODIMENTS

Fastener 40 of FIGS. 1A and 1B includes a hollow resilient frusto-conical projection 2 having an entrance opening 4 shown in FIG. 1B that is axially aligned with an exit opening in the form of non-circular polygonal shaped aperture 7. Although fastener 40 may include a substantially flat base portion 10 from which projects frusto-conical projection 2, it may of course project gradually from a lower peripheral edge rather than from base portion 10.

Entrance opening 4 is preferably circular and adapted to receive therethrough cylindrical shaft diameters of a prescribed range hereinafter discussed with respect to FIG. 1C.

In contrast to prior art type frusto-conical projections whose side wall is discontinuous by being circumferentially segmented by radially outwardly extending slits, the side wall of projection 2 of the fastener of the invention is circumferentially continuous yet able to accommodate a broad range of shank diameters as hereinafter described.

Aperture 7 has the non-circular shape of a triangle as shown in FIG. 1A. Aperture 7 is defined between spaced-apart retaining edges 8a, 8b and 8c which are joined at their respective extremities to provide the triangular shape of which one region of intersection is referenced generally as intersection region 9 for illustrative purposes.

Edges 8a, 8b and 8c respectively face inwardly and are operative to expand outwardly to accommodate a prescribed range of shank diameters as well as to engage the shank in a manner, that allows the shank to slide through aperture 7 from entrance opening 4 but provides frictional engagement with the shank sufficient to frictionally secure fastener 40 thereto and inhibit movement of the shank in an opposite direction. For the triangular shape of aperture 6 of fastener 40, edges 8a, 8b and 8c are operative to engage the shank at a region generally intermediate their respective extremities.

Aperture 7 is made in a manner such that warped arcuate sections 3 are provided in edges 8a, 8b and 8c adjacent the intersection between their respective extremities. Sections 3 are adapted to first act as a stiffener for edges 8a, 8b and 8c for smaller shank diameters and to then stretch and prevent edges 8a, 8b and 8c from splitting as the shank diameter received through aperture 7 from opening 4 increases from the minimum to the maximum. As shown in FIG. 1A, arcuate sections 3 are preferably curved in an opposite direction to the curvature of edges 8a, 8b and 8e. It is to be noted that by having reversed curvatures, sections 3 act as "stiffeners" for the retaining edges providing them with increased holding force for smaller shank diameters which effect decreases as they stretch to accommodate the larger shank diameters as previously described.

A preferred method for making fasteners in accordance with the invention is to provide a smooth corner on the retaining edge for engaging the shank is similar to that disclosed in U.S. Pat. No. 4,385,431, assigned to the assignee of the present invention and the disclosure of which is incorporated herein by reference. One method for making a fastener of the invention having a frusto-conical projection such as associated with a triangular or square shaped exit aperture involves first piercing the base member with a cylindrical tool for forming the entrance opening and partially forming the exit aperture and then pressing a forming tool through the entrance opening to form the projection and the exit aperture where the tip of the forming tool is shaped to provide the non-circular exit aperture and the base of the forming tool is cylindrical to register with the entrance opening but has a diameter slightly larger than the diameter of the cylindrical tool first open to pierce the base member. Thus, for example, in making a fastener of the invention having a triangular shaped exit aperture, the first tool has a diameter of about 0.170 inch and the cylindrical base of the forming tool has a diameter of about 0.250 inch with the triangular tip having a 120 degree included angle between the sides with the sides tapering at 60 degrees from the base of the forming tool to the point.

As shown in FIG. 6, as well as including the stretchable arcuate sections adjacent the intersections between exit aperture retaining edges, the junction or intersections themselves, such as intersections 9 of fastener 40, characteristically extend a distance "Y" further away from the base member than the central region of the retaining edges. Thus, for example, for a fastener of the invention made from 0.010 inch thick spring steel having triangular shaped exit aperture measuring about 0.183 inch across the center, the fastener has been found effective in fastening shank diameters from about 0.177 inch to about 0.220 inch and features a distance "Y" of about 0.018 inch.

By way of another example, for a fastener of the same thickness having a generally square shaped exit aperture measuring about 0.182 inch across corners and about 0.169 inch across flats, the distance "Y" at the intersection between the sides is about 0.007 inch above the center of the sides and the fastener has been found suitable for securing shank diameters likewise ranging from about 0.177 inch to about 0.220 inch.

In FIG. 1C, fastener 40 is shown pressed on to cylindrical shank 12 which extends from head 14 of a stud "S". Stud "S" is a typical stud having a generally cylindrical shank 12 that is generally circular in cross-section and smaller in cross section than head 14.

Studs, such as studs "S" are commonly used to secure a variety of items to either side of a panel or the like by inserting the shank through an opening in the item to be secure to the panel and thence through the panel opening and securing it by pressing the fastener of the invention onto the shank exposed on the opposite side of the panel through which the stud shank is inserted or by first inserting the stud shank through the panel opening and thence through an opening in the item and thence pressing the fastener of the invention onto the exposed stud shank.

The range of shank 12 diameters able to be secured by fastener 40 is denoted by "X" in FIG. 1C. Resiliency provided by the material and thickness of projection 2 as well as aperture 6 being non-circular and surrounded by at least two retaining edges that include arcuate warped sections 3 adjacent the intersections of their respective extremities enables a broad range "X" of stud shank diameters to be received through opening 2 and aperture 6 and yet suitably secure themselves to the stud shanks in the manner required.

Thus, a fastener of the invention stamped from 0.010 inch thick resilient sheet metal having the triangular or square shaped exit aperture dimensions as previously described is able to suitably secure stud shank diameters ranging between 0.177 inch and 0.220 inch.

Broadly, the fastener of the invention includes a base member having an entrance opening therethrough surrounded by a hollow projection that extends from the base member in overhanging relationship to the entrance opening to an end surrounding a non-circular exit aperture comprising at least two spaced-apart retaining edges that are operative to expand outwardly to accommodate shank diameters ranging from a minimum to a maximum and to engage the member and enable it to slide through the aperture in a direction from the entrance opening towards the aperture and frictionally secure the fastener to the cylindrical member sufficiently to inhibit movement of the member in an opposite direction as well as including warped arcuate sections adjacent the edge intersections that act as stiffeners for smaller shank diameters and are adapted to stretch and prevent the edges from splitting as the shank diameter increases to the maximum within the diameter range predetermined for the particular fastener.

FIG. 2 shows fastener 50 made in accordance with the invention having a projection 16 extending from a rectangular base member 19 and ending in a non-circular oval shaped exit aperture 18 provided by spaced-apart inwardly facing retaining edges 17a and 17b. Numeral 23 denotes the intersection of the respective extremities of edges 17a and 17b and numeral 25 denotes the warped arcuate sections adjacent with intersection 23 that are adapted to stretch in the manner herein before described. Except for the difference in the non-circular exit aperture shaped between fasteners 40 and 50, their operation is identical in providing both expandability to accommodate a range of cylindrical diameters without splitting as herein before described.

FIG. 3 shows a fastener 60 made in accordance with the invention that features a frusto-conical projection 20 extending from a base member 26 and ending a non-circular polygonal shaped exit aperture 22 provided by inwardly facing spaced-apart retaining edges 21a, 21b, 21c and 21d. As used herein, the term "non-circular" includes triangular and oval shaped exit apertures as well as polygonal shaped exit apertures defined between at least four retaining edges such as square, pentagon, hexagon, and octagon shaped apertures.

The intersections between the respective extremities of retaining edges 21a, 21b, 21c and 21d is referenced by numeral 27 with the edges including the stretchable warped arcuate sections adjacent their respective extremity intersections or referenced by numeral 29.

FIG. 4 shows another application for the fastener of the invention in which a cylindrical shank 24 extends through an opening (not referenced) in an object such as panel "P" and fasteners 40 are used to secure shaft 24 to opposite sides of panel "P" to inhibit movement of shaft 24 in opposite axial directions.

FIG. 5 shows a central cross-section through a fastener 70 made in accordance with the invention having a preferred form of a base member associated therewith. In FIG. 5, projection 30 extends from wall 31 of the base member to an upper end surrounding non-circular exit aperture 22'. Wall 31 is preferably an annular wall about projection 30 that may be flat but is preferably dished convexly upwardly and may be supported by peripheral rim 33 shown in FIG. 5. A fastener such as fastener 70 may, for example, be made from a Bellville washer well-known to those skilled in the art. Convex wall 31 is adapted to act resiliently in conjunction with the retaining edges to further enhance the ability of fastener 70 to frictionally secure a cylindrical member such as a stud shank to a panel or the like against which the base member is abutted.

What is claimed is:

1. A fastener for a stud having a generally cross-sectionally circular shank having a diameter ranging from a minimum to a maximum within a predetermined diameter range, said fastener having a base member having an entrance opening for receiving the shank therethrough surrounded by a resilient projection extending from the base member in overhanging relationship to the entrance opening and ending at a free-end thereof surrounding a non-circular exit aperture that is substantially axially aligned with the entrance opening, said free-end comprising at least two opposed spaced-apart edges joined at their respective extremities, said edges respectively having a central outwardly convex retaining portion adapted to engage the shank received therebetween in a direction from the entrance opening in a region intermediate their respective extremities and to expand radially outwardly a distance sufficient to accommodate the shank diameter range whilst exerting a force thereagainst adapted to prevent the shank from moving in an opposite direction, said edges respectively having an outwardly convex portion at the extremities thereof that are elevated a greater distance from the base member than the retaining portion thereof, and said edges respectively including an arcuate warped, outwardly concave portion adjacent their respective extremities operative to stretch and prevent the retaining edges from splitting as they expand radially to accommodate the shank diameter as it increases from the minimum to the maximum within the predetermined diameter range.

2. The fastener of claim 1 having three of the edges and the non-circular exit aperture is a generally triangular shaped aperture.

3. The fastener of claim 1 having two of the edges and the non-circular exit aperture in a generally oval shaped aperture.

4. The fastener of claim 1 having at least four of the edges and the non-circular exit aperture is a generally polygonal shaped aperture.

5. The fastener of claim 1 wherein the base member is a substantially flat base member.

6. The fastener of claim 1 wherein the base member has a disked configuration adapted to act resiliently in conjunction with the retaining edges to enhance securement of the fastener to the stud shank.

7. The fastener of claim 6 wherein the base member includes a peripheral rim extending from a side thereof opposite to the side from which the projection extends for providing support therefore.

* * * * *